(12) United States Patent
Yang et al.

(10) Patent No.: US 8,259,271 B2
(45) Date of Patent: Sep. 4, 2012

(54) COLOR FILTER SUBSTRATE AND LIQUID CRYSTAL DISPLAY PANEL INCLUDING THE SAME

(75) Inventors: Seok Yoon Yang, Cheonan-si (KR); Ji Young Jeong, Cheonan-si (KR); Yun Seok Lee, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/191,099

(22) Filed: Jul. 26, 2011

(65) Prior Publication Data

US 2011/0279760 A1 Nov. 17, 2011

Related U.S. Application Data

(63) Continuation of application No. 11/960,994, filed on Dec. 20, 2007, now Pat. No. 8,004,641.

(30) Foreign Application Priority Data

Dec. 21, 2006 (KR) .................. 10-2006-0131693

(51) Int. Cl.
*G02F 1/1335* (2006.01)
(52) U.S. Cl. ...................... 349/137; 349/106
(58) Field of Classification Search .................. 349/106, 349/110, 122, 137; 359/586, 585, 589, 891; 345/88
See application file for complete search history.

(56) References Cited

U.S. PATENT DOCUMENTS

| | | | |
|---|---|---|---|
| 4,521,079 A | 6/1985 | Leenhouts et al. | |
| 5,592,317 A * | 1/1997 | Fujikawa et al. | 349/110 |
| 6,285,424 B1 | 9/2001 | Yoshida | |
| 2002/0003596 A1* | 1/2002 | Kim | 349/106 |
| 2004/0012707 A1* | 1/2004 | Fukusho et al. | 348/340 |
| 2007/0279560 A1 | 12/2007 | Ishitani et al. | |

FOREIGN PATENT DOCUMENTS

| | | |
|---|---|---|
| JP | 5-196809 | 8/1993 |
| KR | 10-0182018 | 12/1998 |
| KR | 1020000061177 | 10/2000 |
| KR | 1020010009157 | 2/2001 |
| KR | 1020010096156 | 11/2001 |

OTHER PUBLICATIONS

Non-Final Office Action dated Nov. 15, 2010 in U.S. Appl. No. 11/960,994.
Notice of Allowance dated Mar. 24, 2011 in U.S. Appl. No. 11/960,994.

* cited by examiner

*Primary Examiner* — Dung Nguyen
*Assistant Examiner* — Tai Duong
(74) *Attorney, Agent, or Firm* — H.C. Park & Associates, PLC (57) ABSTRACT

A color filter substrate includes a substrate, a black matrix disposed on the substrate, a color filter on a sub-pixel area partitioned by the black matrix, a common electrode disposed on the color filter to receive a common voltage, and an anti-reflective layer configured to prevent the reflection of light in the color filter substrate.

10 Claims, 7 Drawing Sheets

FIG. 1

(PRIOR ART)

FIG. 14

US 8,259,271 B2

COLOR FILTER SUBSTRATE AND LIQUID CRYSTAL DISPLAY PANEL INCLUDING THE SAME

CROSS-REFERENCE TO RELATED APPLICATION

This application a continuation of U.S. patent application Ser. No. 11/960,994, filed on Dec. 20, 2007, claims priority from and the benefit of Korean Patent Application No. 10-2006-0131693, filed on Dec. 21, 2006, which are hereby incorporated by reference for all purposes as if fully set forth herein.

BACKGROUND OF THE INVENTION

1. Field of the Invention

The present invention relates to a color filter substrate, which may improve transmissivity, and a liquid crystal display panel including the same.

2. Discussion of the Background

A liquid crystal display ("LCD") panel displays images by controlling the optical transmissivity of liquid crystal molecules using an electric field. The LCD panel includes a thin film transistor ("TFT") substrate, a color filter substrate coupled with the TFT substrate, and liquid crystal molecules disposed between the TFT substrate and the color filter substrate.

The TFT substrate includes a gate line, a data line crossing the gate line, a TFT disposed where the data line crosses the gate line, and a pixel electrode connected to the TFT.

Figure 1:
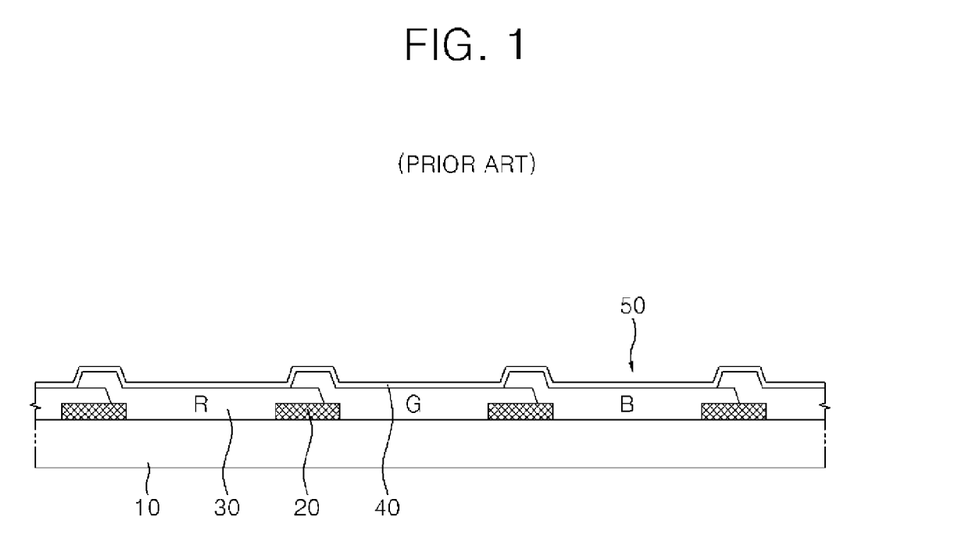
FIG. 1 is a cross-sectional view of a color filter substrate of a conventional LCD.

The color filter substrate includes, as shown in FIG. 1, a substrate 10, a black matrix 20 on the substrate 10 to prevent light leakage, a color filter 30 to provide red (R), green (G), and blue (B) light, and a common electrode 40 to form a vertical electric field together with the pixel electrode. An overcoat layer (not shown) may be further provided between the color filter 30 and the common electrode 40 to planarize the color filter substrate 50.

The color filter substrate 50 displays color by transmitting incident light from a backside via the TFT substrate (not shown) and the liquid crystal molecules (not shown). The common electrode 40, the overcoat layer (not shown), the color filter 30, and the substrate 10 may include materials having different refractive indexes. In a conventional LCD panel, transmissivity may be reduced because light supplied from a light source that passes through the color filter substrate 50 may be reflected at the boundaries of each material, due to differences in the refractive indexes of the materials.

SUMMARY OF THE INVENTION

The present invention provides a color filter substrate, which may improve transmissivity by forming an anti-reflective layer, and a liquid crystal display panel including the same.

Additional features of the invention will be set forth in the description which follows, and in part will be apparent from the description, or may be learned by practice of the invention.

The present invention discloses a color filter substrate including a substrate, a black matrix disposed on the substrate, a color filter on a sub-pixel area partitioned by the black matrix, a common electrode disposed on the color filter to receive a common voltage, and an anti-reflective layer configured to prevent the reflection of light in the color filter substrate.

The present invention also discloses a color filter substrate including a substrate, a black matrix disposed on the substrate, a color filter on a sub-pixel area partitioned by the black matrix, an overcoat layer disposed on the color filter to planarize the color filter, and an anti-reflective layer configured to prevent the reflection of light in the color filter substrate.

The present invention also discloses a liquid crystal display panel including a color filter substrate including a substrate, a black matrix disposed on the substrate, a color filter on a sub-pixel area partitioned by the black matrix, an overcoat layer disposed on the color filter to planarize the color filter, and an anti-reflective layer configured to prevent the reflection of light in the color filter substrate, a thin film transistor substrate opposing the color filter substrate, and liquid crystal molecules disposed between the thin film transistor substrate and the color filter substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 2:
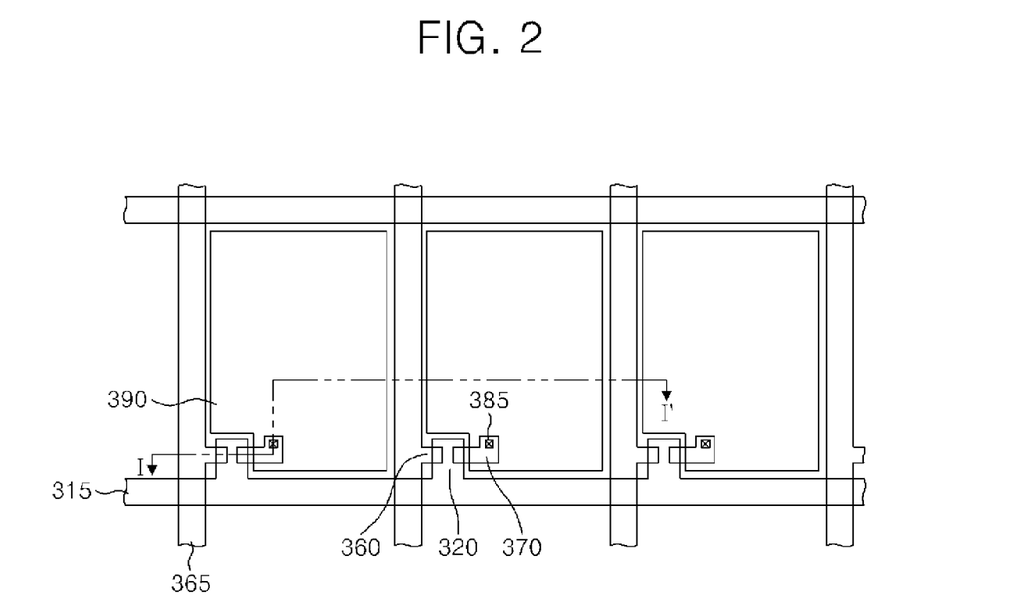
FIG. 2 is a layout of an LCD panel according to a first exemplary embodiment of the present invention.
Figure 3:
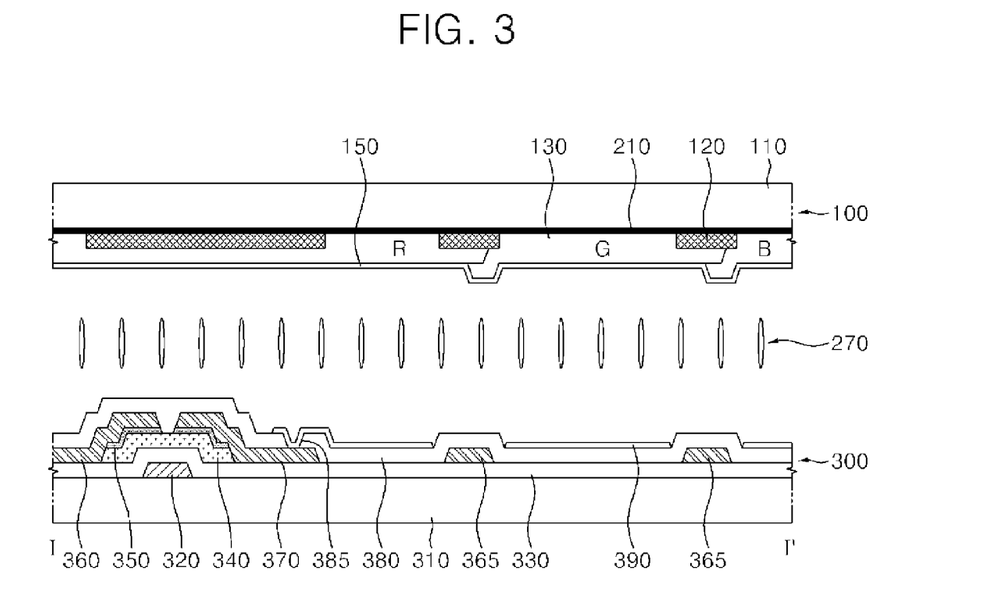
FIG. 3 is a cross-sectional view taken along line I-I' of FIG. 2.

It will be understood that when an element such as a layer, film, region or substrate is referred to as being "on" or "connected to" another element, it can be directly on or directly connected to the other element or intervening elements may also be present. In contrast, when an element is referred to as being "directly on" or "directly connected to" another element, there are no intervening elements present.

FIG. 2 is a layout of an LCD panel according to a first exemplary embodiment of the present invention, and FIG. 3 is a cross-sectional view taken along line I-I' of FIG. 2.

Referring to FIG. 2 and FIG. 3, an LCD panel includes a TFT substrate 300 having a TFT array formed thereon, a color filter substrate 100 opposing the TFT substrate 300, and liquid crystal molecules 270 arranged between the TFT substrate 300 and the color filter substrate 100.

The TFT substrate 300 includes a gate line 315 on a lower substrate 310, a data line 365 crossing the gate line 315 and insulated from the gate line 315, and a plurality of sub-pixels respectively connected to the gate and data lines 315 and 365. Each sub-pixel includes a thin film transistor (TFT) as a switching device and a pixel electrode 390 connected to the TFT.

The gate line 315 provides the TFT with a scan signal supplied from a gate driving unit (not shown). The data line 365 is configured to cross the gate line 315 with a gate insulating layer 330 therebetween and provides the TFT with a data voltage supplied from a data driving unit (not shown).

The TFT provides the pixel electrode 390 with the data voltage supplied via the data line 365 in response to a scan signal provided via the gate line 315. The TFT includes a gate electrode 320 connected to the gate line 315, a semiconductor layer 340 on the gate insulating layer 330 and overlapping the gate electrode 320, an ohmic contact layer 350 on the semiconductor layer 340, a source electrode 360 on the ohmic contact layer 350 and connected to the data line 365, and a drain electrode 370 opposing the source electrode 360. A passivation layer 380 is formed on the TFT and includes a contact hole 385 exposing the drain electrode 370. The drain electrode 370 is connected to the pixel electrode 390 through the contact hole 385.

When a scan signal is supplied to the gate electrode 320 via the gate line 315, the TFT is turned on to provide the pixel electrode 390 with the data voltage supplied from the data line 365. The pixel electrode 390 may include a transparent conductive material and is on the passivation layer 380 to generate a vertical electric field together with a common electrode 150 on the color filter substrate 100. The pixel electrode 390 may be patterned include a plurality of domains in case of a patterned vertically aligned (PVA) mode LCD panel.

The liquid crystal molecules 270 include a material having dielectric anisotropy and adjust light transmissivity when they are driven by an electric field generated between the pixel electrode 390 and the common electrode 150.

The color filter substrate 100 includes a black matrix 120 disposed on an upper substrate 110 to prevent light leakage, a color filter 130 disposed in a pixel area partitioned by the black matrix 120, a common electrode 150 disposed on the color filter 130, and a first anti-reflective layer 210 disposed between the upper substrate 110 and the color filter 130.

The black matrix 120 may include a non-transparent metal or a non-transparent organic or inorganic material and may prevent light leakage. The location of the black matrix 120 corresponds to the gate line 315, the data line 365, and the TFT on the TFT substrate 300. The black matrix 120 may oppose the gate and data lines 315 and 365 to configure a sub-pixel area.

The color filter 130 may be formed by coating the sub-pixel area partitioned by the black matrix 120 with red (R), green (G), and blue (B) color resins. The color filter 130 may include an organic material having a refractive index of about 1.73.

The common electrode 150 is disposed on the color filter 130 and provided with a common voltage. The common electrode 150 generates a vertical electric field together with the pixel electrode 390, which is supplied with a data voltage to drive the liquid crystal molecules 270. The common electrode 150 may include a transparent conductive material, such as indium tin oxide (ITO), indium zinc oxide (IZO), or indium tin zinc oxide (ITZO), and may have a refractive index of about 2.0. The common electrode 150 may be patterned to alternate with the pixel electrode 390 to provide a plurality of domains. When the common electrode 150 is patterned to alternate with the pixel electrode 390, a fringe field is generated between the common and pixel electrodes 150 and 390 to enable the LCD panel to operate in the PVA mode.

The first anti-reflective layer 210 is provided between the upper substrate 110 and the color filter 130. The first anti-reflective layer 210 prevents the reflection of light transmitted through the liquid crystal molecules 270, thereby enhancing the transmissivity of the LCD panel. The first anti-reflective layer 210 may be formed prior to forming the black matrix on the upper substrate 110.

The first anti-reflective layer 210 may prevent light, which is to be transmitted through the upper substrate 110 after passing vertically though the color filter 130, from being reflected on an interface between the color filter 130 and the upper substrate 110 due to different refractive indexes.

A reflectance (r) of a vertically incident light on an interface between materials having different refractive indexes can be calculated by Formula 1.

$$r \approx \left[\frac{(n_1 - n_2)}{(n_1 + n_2)}\right]^2 \qquad \text{[Formula 1]}$$

When light is transmitted though a transparent substrate including glass or plastic, most of the light passes though the transparent substrate but a portion of the light is reflected. The intensity of the reflected light varies according to the refractive index (n) of the material. In Formula 1, the approximate reflectance (r) on an interface between two materials having refractive indexes $n_1$ and $n_2$, respectively, may be calculated when light is transmitted from the material having the first refractive index $n_1$ to the material having the second refractive index $n_2$.

For instance, assuming that refractive indexes of air and the substrate are 0 and 1.52, respectively, the reflectance (r) on the substrate becomes 0.043. If a material having a refractive index between the air refractive index $n_1$ and the substrate refractive index $n_2$ is provided between the substrate and the air, the reflectance becomes 0.012, so the reflectance (r) is considerably enhanced. The reflectance (r) varies according to the refractive index $n_1$ of the first material and the refractive index $n_2$ of the second material.

When the first anti-reflective layer 210 is provided between materials having different refractive indexes, i.e., between the upper substrate 110 and the color filter 130, the reflectance (r) can be calculated by Formula 2.

$$r \approx \left[\frac{(n_1 - n_0)}{(n_1 + n_0)} - \frac{(n_2 - n_1)}{(n_2 + n_1)}\right]^2 \qquad \text{[Formula 2]}$$

The refractive index $n_0$ of the first anti-reflective layer 210 may have a value between the refractive index $n_1$ of the upper substrate 110 and the refractive index $n_2$ of the color filter 130.

For instance, assuming that the refractive index $n_1$ of the upper substrate 110 is 1.52 and the refractive index $n_2$ of the color filter 130 is 1.73, the refractive index $n_0$ of the first anti-reflective layer 210 may have a value between the refractive index $n_1$ of the upper substrate 110 and the refractive index $n_2$ of the color filter 130, and more particularly, a value greater than 1.52 and smaller than 1.73. For example, the first refractive index $n_0$ of the first anti-reflective layer 210 may be the geometric average of the refractive index $n_1$ of the upper substrate 110 and the refractive index $n_2$ of the color filter 130.

The first refractive index $n_0$ of the first anti-reflective layer 210 can be calculated by Formula 3. In particular, the geometric average of two materials can be expressed as a square root of the product of the refractive indexes of the two materials. So, in this example, the refractive index $n_0$ of the first anti-reflective layer 210 should be 1.62.

$$n_0 = \sqrt{n_1 \times n_2}$$ [Formula 3]

The first anti-reflective layer 210 may include a material having the first refractive index $n_0$. The first anti-reflective layer 210 may include metal, an organic insulator, and/or an inorganic insulator. For instance, the first anti-reflective layer 210 may include $Al_2O_3$, $SiOx$, $MgF_2$, $AlF_2$, $CeF_3$, $LaF_3$, and/or $NdF_3$.

When the first anti-reflective layer 210 includes $Al_2O_3$, conventional color filter substrate fabricating equipment may be used to prevent additional manufacturing costs. For instance, a first anti-reflective layer 210 including $Al_2O_3$ may be about 200 to about 1,000 Å thick and may be formed on the upper substrate 110 by a deposition process, such as sputtering.

According to experimental data, if the refractive index $n_0$ of the first anti-reflective layer 210 is equal to or smaller than about 1.52 or equal to or greater than about 1.73, the reflectance (r) increases. Hence, the first refractive index $n_0$ of the first anti-reflective layer 210 may be between 1.53 and 1.72, i.e., 1.62, which is the geometric average of 1.52 and 1.73. In this case, the first anti-reflective layer 210 may reduce the reflectance (r), which may increase transmissivity.

Figure 4:
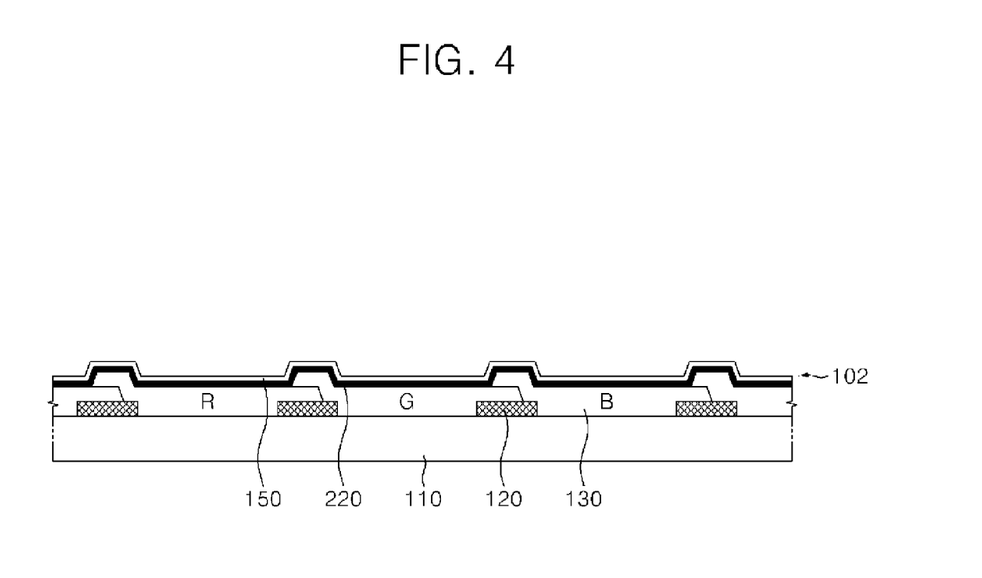
FIG. 4 and FIG. 5 are cross-sectional views of alternative color filter substrates for the LCD panel according the first exemplary embodiment of the present invention.
Figure 5:
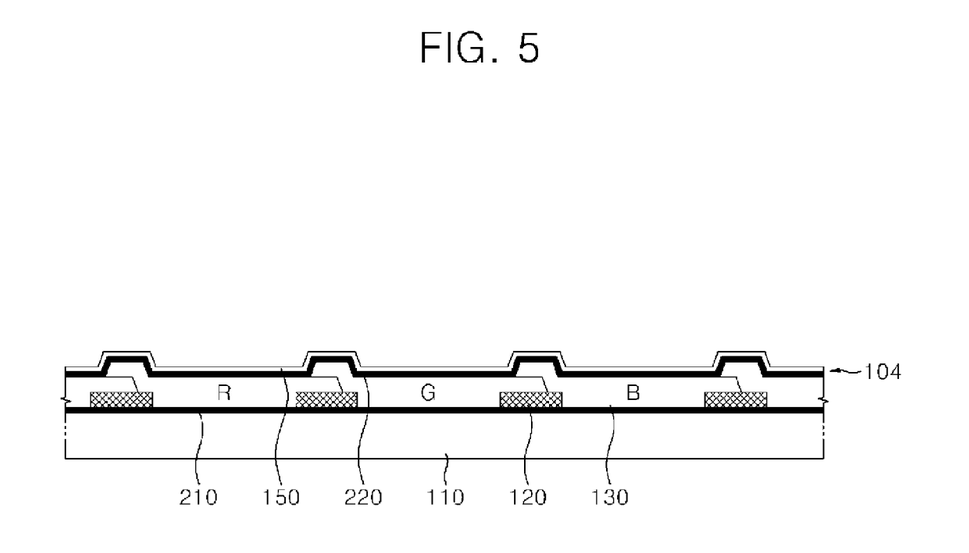

FIG. 4 and FIG. 5 are cross-sectional views of alternative color filter substrates for the LCD panel according to the first exemplary embodiment of the present invention.

Referring to FIG. 4, a color filter substrate 102 includes a black matrix 120 formed on an upper substrate 110, a color filter 130 provided in a sub-pixel area partitioned by the black matrix 120 on the upper substrate 110, a second anti-reflective layer 220 disposed on the color filter 130, and a common electrode 150 disposed on the second anti-reflective layer 220.

The second anti-reflective layer 220 may include metal, inorganic material, and/or organic material. For example, the second anti-reflective layer 220 may include silicon nitride (SiNx). The silicon nitride (SiNx) is an inorganic insulating material or a non-metal material that has a reflectance reducing ratio of about 40% and does not affect the formation of the common electrode 150 on the second anti-reflective layer 220.

The second anti-reflective layer 220 may include a material having a refractive index between a refractive index of the color filter 130 and a refractive index of the common electrode 150. For instance, when the refractive indexes of the color filter 130 and the common electrode 150 are 1.73 and 2.0, respectively, the second anti-reflective layer 220 may have a refractive index greater than the refractive index (1.73) of the color filter 130 and smaller than the refractive index (2.0) of the common electrode 150. For example, the refractive index of the second anti-reflective layer 220 may be 1.86, which is the geometric average of 1.73 and 2.0.

The black matrix 120, the color filter 130, and the common electrode 150 are the same to those explained with regard to FIG. 3 and therefore, a detailed explanation thereof is omitted in the following description. According to experimental data, when the second anti-reflective layer 220 shown in FIG. 4 has a refractive index of about 1.86, the reflectance (r) may be decreased, thereby increasing transmissivity.

FIG. 5 shows another alternative color filter substrate for the LCD panel according to the first exemplary embodiment of the present invention.

Referring to FIG. 5, a color filter substrate 104 includes a first anti-reflective layer 210 disposed on an upper substrate 110, a black matrix 120 disposed on the first anti-reflective layer 210, a color filter 130 provided on a sub-pixel area partitioned by the black matrix 120, a second anti-reflective layer 220 disposed on the color filter 130, and a common electrode 150 disposed on the second anti-reflective layer 220.

The first anti-reflective layer 210, the black matrix 120, the color filter 130, the second anti-reflective layer 220, and the common electrode 150 are the same as those described with regard to FIG. 3 and FIG. 4 and therefore, a detailed description thereof is omitted in the following description. According to experimental data, when the first and second anti-reflective layers 210 and 220 shown in FIG. 5 have refractive indexes of 1.62 and 1.86, respectively, the reflectance (r) of the LCD panel may decrease, thereby increasing transmissivity.

Figure 6:
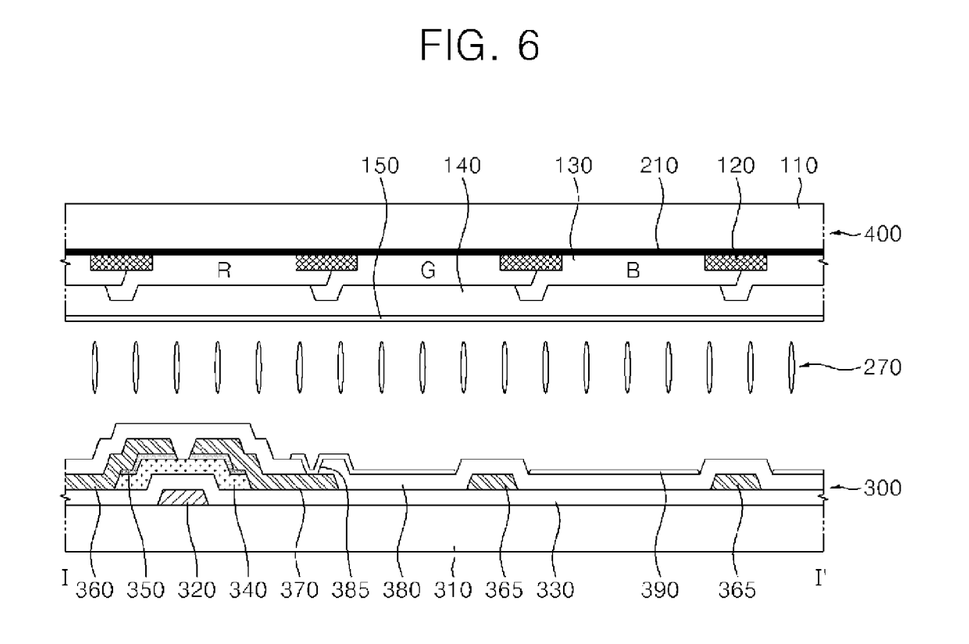
FIG. 6 is a cross-sectional view of an LCD panel according to a second exemplary embodiment of the present invention.

FIG. 6 is a cross-sectional view of an LCD panel according to a second exemplary embodiment of the present invention.

Referring to FIG. 6, an LCD panel according to a second exemplary embodiment of the present invention includes a TFT substrate 300, a color filter substrate 400 opposing the TFT substrate 300, and liquid crystal molecules 270 arranged between the TFT substrate 300 and the color filter substrate 400.

The color filter substrate 400 includes a black matrix 120, a color filter 130 on each sub-pixel area partitioned by the black matrix 120, a common electrode 150 to receive a common voltage, an overcoat layer 140 provided between the color filter 130 and the common electrode 150, and a first anti-reflective layer 210 between the upper substrate 110 and the color filter 130.

The overcoat layer 140 prevents the common electrode 150 from being formed unevenly due to a step difference of the color filter 130. The step difference of the color filter 130 may be generated if the color filter 130 overlaps the black matrix 120 or if the color filter 130 provided to a prescribed sub-pixel overlaps the color filter 130 provided to a neighboring sub-pixel.

The overcoat layer 140 may include an organic insulator and is disposed on the color filter 130 to planarize the step difference generated by the color filter 130. Therefore, the common electrode 150 on the overcoat layer 140 may be planar. That is, the overcoat layer 140 planarizes the step difference of the color filter 130 to prevent abnormal electric field generation between the common electrode 150 and the pixel electrode 390. Hence, it may be possible to prevent the liquid crystal molecules 270 from being abnormally driven, thereby enhancing image quality.

Like the aforementioned first anti-reflective layer explained in the first exemplary embodiment of the present invention, the first anti-reflective layer 210 may include a material having a first refractive index between the upper substrate 110 and the color filter 130.

The black matrix 120, the color filter 130, the common electrode 150, and the TFT substrate 300 are the same as those described with regard to FIG. 3 and therefore, a detailed explanation thereof is omitted in the following description.

Figure 7:
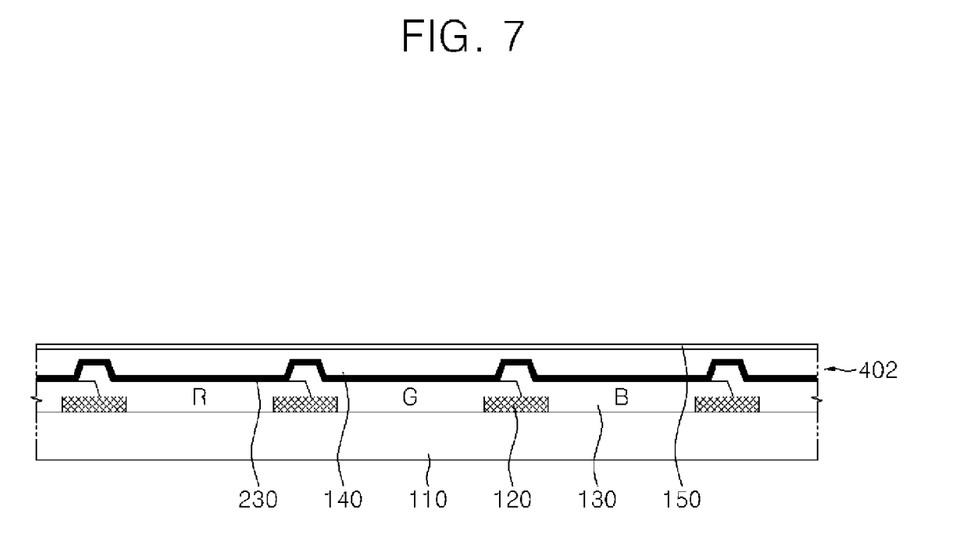
FIG. 7, FIG. 8, FIG. 9, FIG. 10, and FIG. 11 are cross-sectional views of alternative color filter substrates for the LCD panel according to the second exemplary embodiment of the present invention.

FIG. 7 is a cross-sectional view of an alternative color filter substrate for the LCD panel according to the second exemplary embodiment of the present invention.

Referring to FIG. 7, a color filter substrate 402 includes a black matrix 120 disposed on an upper substrate 110, a color filter 130 disposed on a sub-pixel area partitioned by the black matrix 120, a second anti-reflective layer 220 disposed on the color filter 130, an overcoat layer 140 disposed on the second anti-reflective layer 220, and a common electrode 150 disposed on the overcoat layer 140.

The second anti-reflective layer 230 is disposed between the color filter 130 and the overcoat layer 140. The second anti-reflective layer 230 may have a refractive index between the refractive index of the color filter 130 and the refractive index of the overcoat layer 140. For instance, when the refractive indexes of the color filter 130 and the overcoat layer 140 are 1.73 and 1.55, respectively, the reflectance (r) may increase if the refractive index of the second anti-reflective layer 230 is smaller than 1.55 or greater than 1.73. If so, light transmissivity may be reduced. To prevent this problem, the second anti-reflective layer 230 may have a refractive index greater than 1.55 and smaller than 1.73. For example, the refractive index of the second anti-reflective layer 230 may be the geometric average of the refractive indexes of the overcoat layer 140 and the color filter 130. In the above example, the refractive index of the second anti-reflective layer 230 should be 1.64 according to Formula 3.

The second anti-reflective layer 230 may include metal, an inorganic insulator, and/or an organic insulator, e.g., $Al_2O_3$, SiOx, $MgF_2$, $AlF_2$, $CeF_3$, $LaF_3$, $NdF_3$, and/or SiNx.

In the present exemplary embodiment, the second anti-reflective layer 230 of the color filter substrate 402 may include the same material, e.g., $Al_2O_3$, as the first anti-reflective layer 210.

Figure 8:
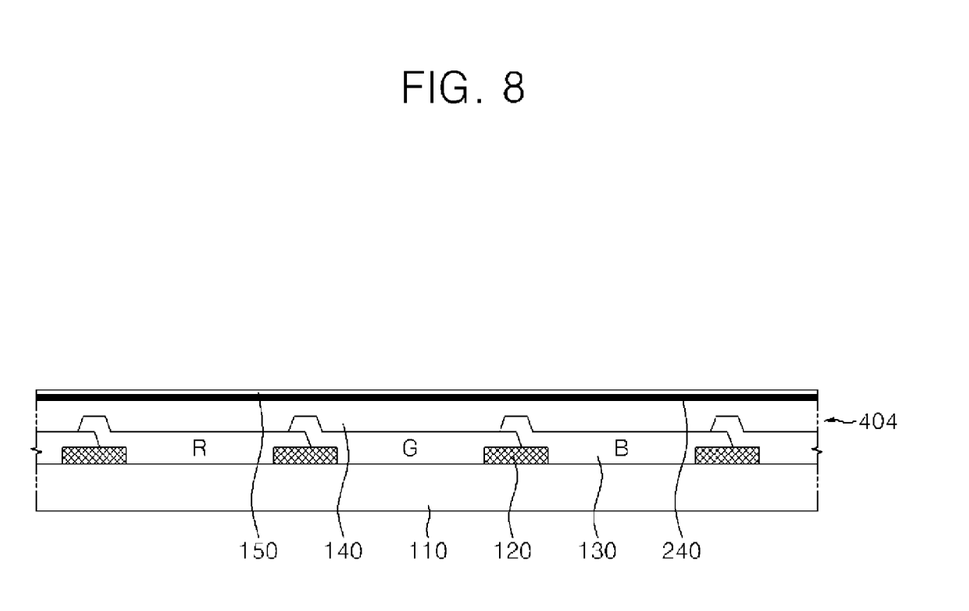

FIG. 8 is a cross-sectional view of another alternative color filter substrate that may alternatively be included in the LCD panel according to the second exemplary embodiment of the present invention.

Referring to FIG. 8, an alternative color filter substrate 404 for the LCD panel according to the second exemplary embodiment of the present invention includes a black matrix 120 disposed on an upper substrate 110, a color filter 130 disposed on a sub-pixel area partitioned by the black matrix 120, an overcoat layer 140 disposed on the color filter 130, a third anti-reflective layer 240 disposed on the overcoat layer 140, and a common electrode 150 formed on the third anti-reflective layer 240.

The third anti-reflective layer 240 may include a material having a third refractive index between the refractive indexes of the overcoat layer 140 and the common electrode 150, such as metal, an inorganic insulator, and/or an organic insulator. The refractive index of the third anti-reflective layer 240 may be greater than the refractive index (1.55) of the overcoat layer 140 and smaller than the refractive index (2.00) of the common electrode 150, e.g., 1.76, which is the geometric average of the refractive indexes of the overcoat layer 140 and the common electrode 150.

The third anti-reflective layer 240 may include a low refractive index material such as $Al_2O_3$, SiOx, $MgF_2$, $AlF_2$, $CeF_3$, $LaF_3$, and/or $NdF_3$. Alternatively, the third anti-reflective layer 240 may include silicon nitride (SiNx). Silicon nitride (SiNx) is an inorganic insulating material or a non-metal material that has a reflectance reducing ratio of about 40% and does not affect the formation of the common electrode 150 on the third anti-reflective layer 240.

The color filter substrate for the LCD panel according to the second exemplary embodiment of the present invention may include at least two of the first, second, and third anti-reflective layers 210, 230, and 240 described with regard to FIG. 6, FIG. 7, and FIG. 8, respectively.

Figure 9:
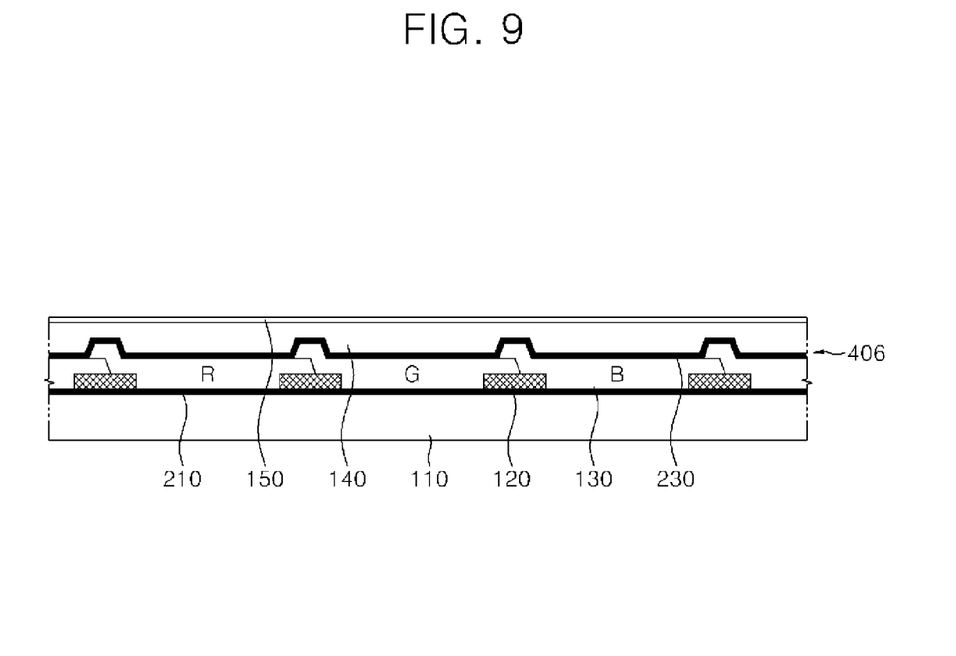

FIG. 9 is a cross-sectional view of another alternative color filter substrate for the LCD panel according to the second exemplary embodiment of the present invention.

Referring to FIG. 9, a color filter substrate 406 includes a first anti-reflective layer 210 disposed on an upper substrate 110, a black matrix 120 disposed on the first anti-reflective layer 210, a color filter 130 provided on a sub-pixel area partitioned by the black matrix 120 on the first anti-reflective layer 210, a second anti-reflective layer 230 on the color filter 130, an overcoat layer 140 on the second anti-reflective layer 230, and a common electrode 150 disposed on the overcoat layer 140.

The first anti-reflective layer 210 may have a refractive index between the refractive indexes of the substrate 110 and the color filter 130. The second anti-reflective layer 230 may have a refractive index between the refractive indexes of the color filter 130 and the overcoat layer 140. The black matrix 120, the color filter 130, the common electrode 150, and the overcoat layer 140 are the same as those of the color filter substrates 400 and 402 explained in FIG. 6 and FIG. 7 and therefore, a detailed explanation thereof is omitted in the following description.

When light that has passed through the liquid crystal molecules 270 is sequentially transmitted via the second anti-reflective layer 230 and the first anti-reflective layer 210 of the color filter substrate 406, the difference in the refractive indexes may be reduced to decrease the intensity of reflected light. Hence, the transmissivity may be enhanced.

Figure 10:
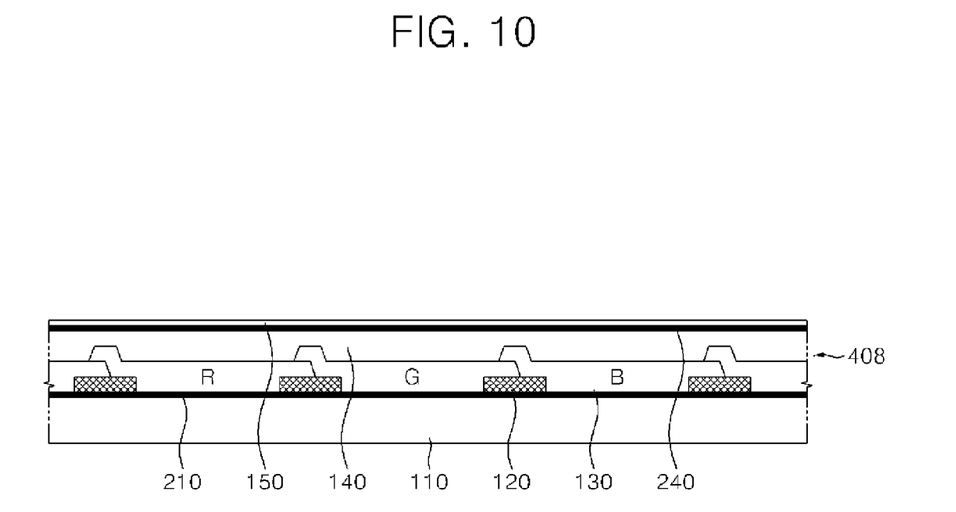

FIG. 10 is a cross-sectional view of another alternative color filter substrate for the LCD panel according to the second exemplary embodiment of the present invention.

Referring to FIG. 10, another alternative color filter substrate 408 that may be included in the LCD panel shown in FIG. 6 includes a first anti-reflective layer 210 disposed on an upper substrate 110, a black matrix 120 disposed on the first anti-reflective layer 210, a color filter 130 provided in a sub-pixel area partitioned by the black matrix 120 on the first anti-reflective layer 210, an overcoat layer 140 disposed on the color filter 130, a third anti-reflective layer 240 on the overcoat layer 140, and a common electrode 150 disposed on the third anti-reflective layer 240.

The first anti-reflective layer 210 may have a refractive index between the refractive indexes of the substrate 110 and the color filter 130. The third anti-reflective layer 240 may have a refractive index between the refractive indexes of the overcoat layer 140 and the common electrode 150. The black matrix 120, the color filter 130, and the common electrode 150 are the same as those of the color filter substrates 400 and 404 explained in FIG. 6 and FIG. 8 and therefore, a detailed explanation thereof is omitted in the following description.

When light that passed through the liquid crystal molecules 270 is sequentially transmitted via the third anti-reflective layer 240 and the first anti-reflective layer 210 of the color filter substrate 408, the difference in the refractive indexes may be reduced to decrease the intensity of the reflected light. Hence, the transmissivity may be enhanced.

Figure 11:
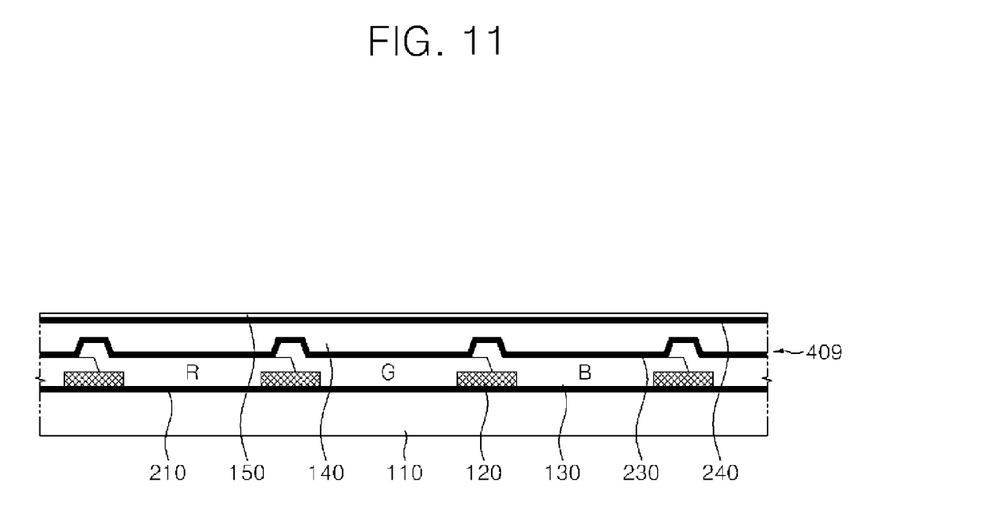

FIG. 11 is a cross-sectional view of another alternative color filter substrate for the LCD panel according to the second exemplary embodiment of the present invention.

Referring to FIG. 11, a color filter substrate 409 includes a first anti-reflective layer 210 disposed on an upper substrate 110, a black matrix 120 formed on the first anti-reflective layer 210, a color filter 130 provided in a sub-pixel area partitioned by the black matrix 120 on the first anti-reflective layer 210, a second anti-reflective layer 230 disposed on the color filter 130, an overcoat layer 140 disposed on the second anti-reflective layer 230, a third anti-reflective layer 240 on the overcoat layer 140, and a common electrode 150 disposed on the third anti-reflective layer 240.

The first anti-reflective layer 210 may have a refractive index between the refractive indexes of the substrate 110 and the color filter 130. The second anti-reflective layer 230 may have a refractive index between the refractive indexes of the color filer 130 and the overcoat layer 140. The third anti-reflective layer 240 may have a refractive index between the refractive indexes of the overcoat layer 140 and the common electrode 150. The black matrix 120, the color filter 130, the common electrode 150, and the overcoat layer 140 are the same as those of the color filter substrates 400, 402, and 404 explained in FIG. 6, FIG. 7, and FIG. 8 and therefore, a detailed explanation thereof is omitted in the following description.

The color filter substrate 409 of the present exemplary embodiment includes first, second, and third anti-reflective layers 210, 230, and 240. When light that passed through the liquid crystal molecules 270 is sequentially transmitted via the third, second, and first anti-reflective layers 240, 230, and 210 of the color filter substrate 409, the difference between the refractive indexes may be reduced at each interface to decrease the intensity of the reflected light. Hence, the transmissivity may be enhanced. Also, separate masks to form the first, second, and third anti-reflective layers 210, 230, and 240 are not required. Hence, it may be possible to fabricate the color filter substrate 409 without a considerable increase in fabrication costs.

Figure 12:
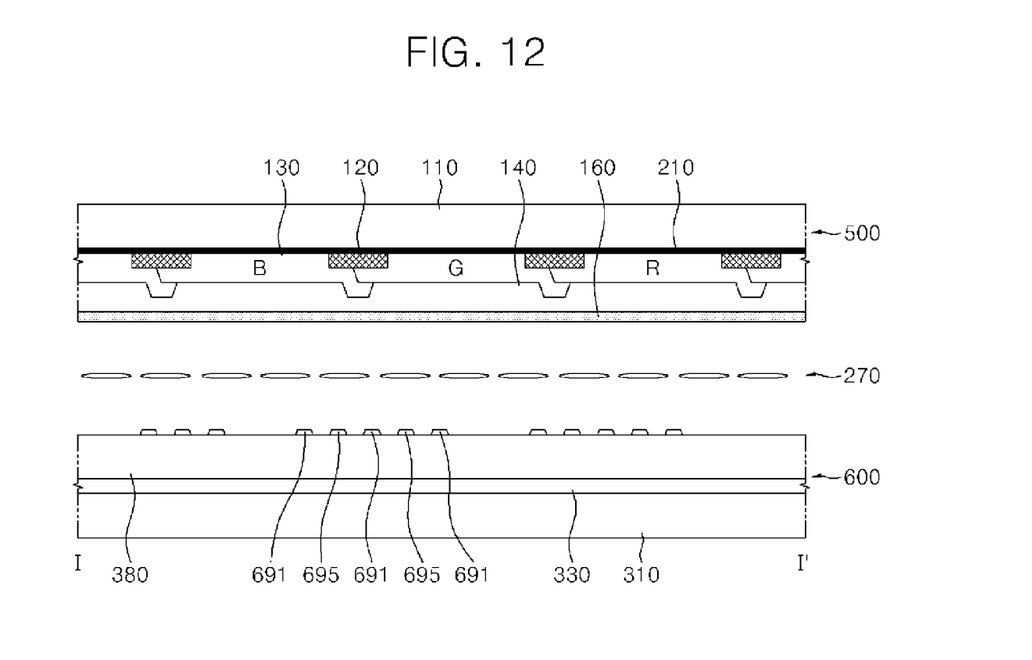
FIG. 12 is a cross-sectional view of an LCD panel according to a third exemplary embodiment of the present invention.

FIG. 12 is a cross-sectional view of an LCD panel according to a third exemplary embodiment of the present invention.

Referring to FIG. 12, an LCD panel according a third exemplary embodiment of the present invention is an in-plane switching mode LCD panel and includes a TFT substrate 600 having a common electrode 695 disposed on a lower substrate 310 to alternate with a pixel electrode 691, a color filter substrate 500 opposing the TFT substrate 600, and liquid crystal molecules 270 arranged between the TFT substrate 600 and the color filter substrate 500. The color filter substrate 500 includes a first layer 210, a black matrix 120, a color filter 130, an overcoat layer 140, and an alignment layer 160 disposed on the overcoat layer 140 to align the liquid crystals 270.

The TFT substrate 600 includes a sub-pixel area defined on the lower substrate 310 by gate and data lines, a TFT provided in the sub-pixel area and connected to the gate and data lines, the pixel electrode 691 connected to the TFT, and the common electrode 695 configured to alternate with the pixel electrode 691 to generate a horizontal electric field.

The TFT (not shown) includes a gate electrode connected to the gate line, a gate insulating layer on the gate electrode and the gate line, a semiconductor layer on the gate insulating layer and overlapping the gate electrode, an ohmic contact layer on the semiconductor layer, a source electrode on the ohmic contact layer and connected to the data line, and a drain electrode opposing the source electrode and connected to the pixel electrode 691.

If a scan signal is supplied to the gate electrode via the gate line, a data voltage supplied to the source electrode via the data line is supplied to the pixel electrode 691 via the drain electrode.

The pixel electrode 691 is disposed on a passivation layer 380 and connected to the drain electrode via a pixel contact hole penetrating the passivation layer 380. The common electrode 695 is disposed on the passivation layer 380 to alternate with the pixel electrode 691. As the pixel electrode 691 and the common electrode 695 are on the same plane, if data and common voltages are applied to the pixel and common electrodes 691 and 695, respectively, a horizontal electric field is generated between the pixel and common electrodes 691 and 695 to drive the liquid crystal molecules 270.

The color filter substrate 500 includes the first anti-reflective layer 210 on the upper substrate 110, the black matrix 120 on the first anti-reflective layer 210, the color filter 130 on the sub-pixel area partitioned by the black matrix 120, the overcoat layer 140 on the color filter 130, and the alignment layer 160 on the overcoat layer 140 to align the liquid crystal molecules 270.

The alignment layer 160 may include an organic material, such as polyimide, or an inorganic material, such as $SiO_2$, to align the liquid crystal molecules 270. The alignment layer 160 aligns the liquid crystal molecules disposed between the TFT substrate 600 and the color filter substrate 500. The alignment layer 160 may be about 500 to about 1,000 Å thick and may be formed by printing or spin coating.

The first anti-reflective layer 210 may include $Al_2O_3$, SiOx, $MgF_2$, $AlF_2$, $CeF_3$, $LaF_3$, $NdF_3$, and/or SiNx. The first anti-reflective layer 210 may have a refractive index between a refractive index of the upper substrate 110 and a refractive index of the color filter 130. For instance, when the refractive indexes of the upper substrate 110 and the color filter 130 are 1.52 and 1.73, respectively, the first anti-reflective layer 210 may have a refractive index between the refractive index (1.52) of the upper substrate 110 and the refractive index (1.73) of the color filter 130. For example, the refractive index of the first anti-reflective layer 210 may be 1.62, which is the geometric average of the refractive indexes of the upper substrate 110 and the color filter 130.

The black matrix 120, the color filter 130, and the overcoat layer 140 are the same as those of the first and second exemplary embodiments of the present invention and therefore, a detailed explanation thereof is omitted in the following description.

Figure 13:
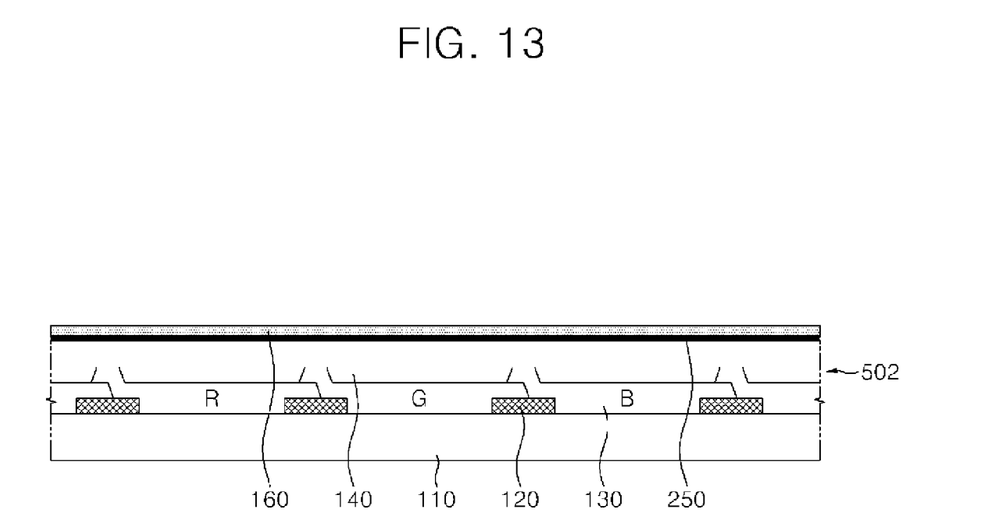
FIG. 13 and FIG. 14 are cross-sectional views of alternative color filter substrates for the LCD panel of the third exemplary embodiment of the present invention.

Another color filter substrate for the LCD panel according to the third exemplary embodiment of the present invention may further include an anti-reflective layer between the color filter 130 and the overcoat layer 140 or between the overcoat layer 140 and the alignment layer 160 in FIG. 12. FIG. 13 is a cross-sectional view of a color filter substrate 502 having a second anti-reflective layer 250 between the overcoat layer 140 and the alignment layer 160. The second anti-reflective layer 250 may include a material having a refractive index between refractive indexes of the overcoat layer 140 and the alignment layer 160. In this case, the second anti-reflective layer 250 may include a material having a different refractive index than the material of the alignment layer 160.

An alternative color filter substrate for the LCD panel according to the third exemplary embodiment of the present invention may include both of first and second anti-reflective layers 210 and 250. For example, as shown in FIG. 14, a color filter substrate 504 includes both first and second anti-reflective layers 210 and 250.

Figure 14:
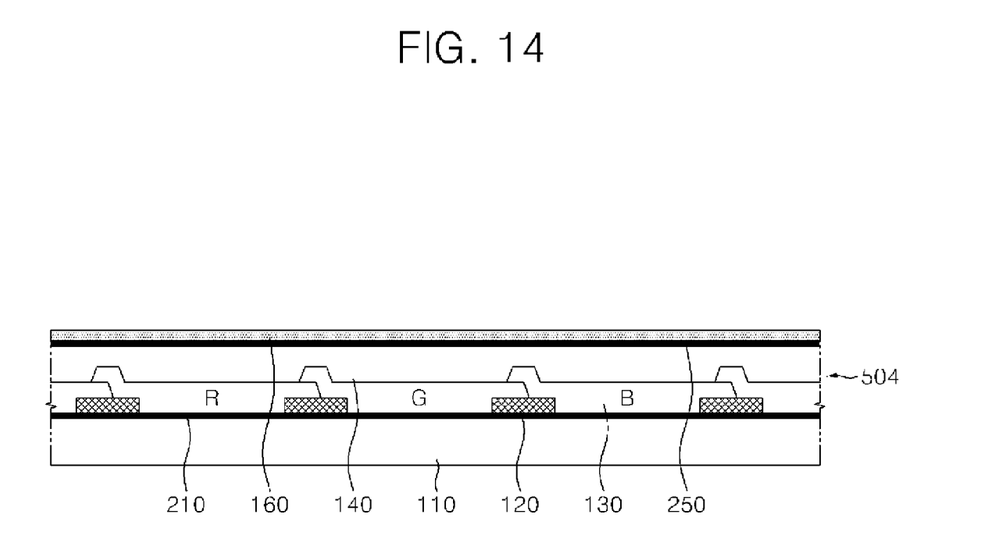

In particular, the color filter substrate 504 of FIG. 14 includes a first anti-reflective layer 210 disposed on an upper substrate 110, a black matrix 120 disposed on the first anti-reflective layer 210, a color filter 130 on a sub-pixel area partitioned by the black matrix 120, a color filter 130, an overcoat layer 140 disposed on the color filter 130, a second anti-reflective layer 250 disposed on the overcoat layer 140, and an alignment layer 160 disposed on the second anti-reflective layer 250.

Accordingly, the exemplary embodiments of the present invention provide many advantages.

First of all, an anti-reflective layer on a color filter substrate may prevent the reflection of backside light, thereby enhancing transmissivity.

Secondly, an anti-reflective layer may be formed by a deposition process, such as sputtering, without an additional masking process, thereby reducing the cost of fabricating a color filter substrate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A substrate, comprising:
a black matrix disposed on a base substrate;
a color filter on a sub-pixel area partitioned by the black matrix;
a common electrode disposed on the color filter; and
an anti-reflective layer configured to prevent the reflection of light incident in the base substrate, the anti-reflective layer comprising:
a first anti-reflective layer disposed between the base substrate and the color filter; and
a second anti-reflective layer disposed between the color filter and the common electrode,
wherein the second anti-reflective layer has a uniform thickness across the substrate.

2. The substrate of claim 1, wherein the common electrode is configured to receive a common voltage.

3. The substrate of claim 1, wherein the first anti-reflective layer has a refractive index between a refractive index of the base substrate and a refractive index of the color filter.

4. The substrate of claim 1, wherein the second anti-reflective layer has a refractive index between the refractive index of the color filter and a refractive index of the common electrode.

5. The substrate of claim 1, wherein the first anti-reflective layer comprises one of $Al_2O_3$, SiOx, $MgF_2$, $AlF_2$, $CeF_3$, $LaF_3$, and $NdF_3$.

6. The substrate of claim 1, wherein the second anti-reflective layer comprises silicon nitride (SiNx).

7. The substrate of claim 1, wherein the first anti-reflective layer comprises $Al_2O_3$.

8. The substrate of claim 7, wherein a thickness of the first anti-reflective layer is 200 Å to 1,000 Å.

9. The substrate of claim 1, wherein the first anti-reflective layer comprises $Al_2O_3$, and
wherein the second anti-reflective layer comprises silicon nitride (SiNx).

10. The substrate of claim 1, wherein the second anti-reflective layer is a non-planarizing layer.

* * * * *